US005546850A

United States Patent [19]
Zaveri

[11] Patent Number: 5,546,850
[45] Date of Patent: Aug. 20, 1996

[54] ELECTRIC ROLLING PIN APPARATUS FOR MAKING DISCS OF DOUGH

[76] Inventor: Vikram H. Zaveri, 6723 122nd Ave., Fennville, Mich. 49408

[21] Appl. No.: 498,920

[22] Filed: Jul. 6, 1995

[51] Int. Cl.$^6$ .................................................. A47J 19/00
[52] U.S. Cl. .................. 99/349; 99/353; 100/210
[58] Field of Search .................. 99/349, 353, 450.2, 99/450.1; 100/156, 210

[56] References Cited

U.S. PATENT DOCUMENTS

| | | | |
|---|---|---|---|
| 3,457,853 | 7/1969 | Morley | 100/210 X |
| 5,211,108 | 5/1993 | Gore et al. | 100/210 X |

Primary Examiner—David Scherbel
Assistant Examiner—Reginald L. Alexander

[57] ABSTRACT

A novel electromechanical apparatus for operating the conventional rolling pin on a motor-driven disc board for making dough discs out of dough balls. The apparatus comprising: a box-like housing structure for the mechanism; a motor-driven disc board on top of the housing structure; a reciprocating rolling pin on top of the rotating disc board; a glider for mounting the rolling pin; a slider-guide mechanism for imparting reciprocatory motion to the glider; a drive link for translating the rotary motion of a motor-driven eccenter into the reciprocatory motion of the slider; a frame structure for supporting the aforesaid drive system; a manually shiftable motor mounting bracket for varying the rolling pin stroke length; a four-bar mechanism for raising and lowering the entire frame structure along with the drive system to effectuate raising, lowering, and pressing of the rolling pin over the dough; two lower brackets, rigidly attached to the housing walls for mounting the four-bar mechanism; a momentary stop switch for cutting off power when the rolling pin is fully upraised; a plurality of resilient means for counterbalancing all stationary and moving loads, and for keeping the contacts of the momentary stop switch open; a multifunction control handle for raising, lowering, and pressing of the rolling pin, for actuating the momentary stop switch, and for changing the rolling pin stroke length; and a variable speed gearmotor for changing the speed of the rolling pin stroke and for halting the rolling pin at the extremities of its longest stroke.

22 Claims, 9 Drawing Sheets

ELECTRIC ROLLING PIN APPARATUS FOR MAKING DISCS OF DOUGH

FIELD OF THE INVENTION

Manually operated rolling pins are the most ancient and universal kitchen aids. The present invention utilizes a motorized rolling pin to achieve identical performance to that of the manually operated rolling pin, thereby substantially reducing the manual effort involved in operating a rolling pin for extended periods of time. Moreover, all the advantages of mechanization of a hitherto manual process are quite evident. Rolling pins are ideal for making discs of dough utilized in preparing tortillas, pizza shells, pita bread or Asian Indian dishes such as chapati, paratha, puri and the like or a variety of other pastry items such as pie crusts.

SUMMARY OF THE PRIOR ART

There are a number of patents relating to prior efforts to achieve mechanization of dough disc production. See for example U.S. Pat. No. 4,838,153 to ESCAMILLA et al, which describes an apparatus for pressing the dough ball between two plates, and U.S. Pat. No. 4,815,859 to WEINKLE, which relates to a roller device for making pizza shell. However, none of these devices is suitable as a domestic appliance. Some of these apparatuses are too specialized and are useful only for making a very specific dough product. Almost all are intended for use in a restaurant or bakery-like environment and are rather cumbersome and bulky for household purposes. Many of the press type devices have a disadvantage of squeezing the moisture out of the dough due to excessive pressure as compared with roller-type devices. This moisture is usually helpful in forming steam pockets inside chapati or puri. Besides, there is a problem of dough discs sticking to the press plates and the necessity of frequent adjustments when a variety of items are pressed. It is difficult for the operator to manipulate the dough manually in the middle of the pressing operation. In short, them is a considerable departure from the basic process of rolling a dough ball into a disc.

Them are several other apparatuses such as described in U.S. Pat. No. 4,800,807 to MANI and U.S. Pat. No. 4,938,126 to RUBIO et al, which are suitable only for mass production of a specific end product in a commercial bakery type environment.

SUMMARY OF THE INVENTION

The invention provides a novel electromechanical apparatus for operating a conventional rolling pin on a motor-driven disc shaped board or plate for rolling dough balls into discs of desired thickness and diameter. Another object of the invention is to provide an apparatus which is suitable as a domestic appliance and also useful in restaurant type environment. Almost the entire mechanism of the apparatus is housed inside an enclosed structure supported by four legs, thus ensuring utmost safety to the operator. The disc board is mounted on a driveshaft of a disc drive gearmotor, protruding outwardly through a hole in a top member of the enclosed housing. Machines requiring large disc boards are fitted with a multiplicity of rollers on the top member of the housing to support the disc board near its periphery. The disc board can be easily removed from the drive shaft for cleaning purposes by simply lifting it up. Two arms of a glider are upwardly projected through two long parallel slots on the top member of the housing. A conventional rolling pin is disposed between these two arms of the glider with its central pivot bar passing through holes on the upper ends of each arm. The bar is pivotally retained on the glider arms by two wing nuts disposed on its threaded ends. The rolling pin can be dismounted for cleaning purposes by removing one of the wing nuts.

The central feature of the embodiment of the present invention comprises a mechanism for imparting complex motions to the rolling pin mounted on the glider arms, which are driven by a variable speed motor, also described as a main drive motor, and are capable of making reciprocatory motion within the long parallel slots provided on the top member of the housing. This reciprocatory motion is feasible due to a slider-guide mechanism within the housing. A slider is rigidly secured to the bottom of the U-shaped glider and disposed within a guide member such as a box channel which is usually roll formed. The box channel constitutes one of the sides of a rectangular frame-like structure disposed in a horizontal plane. The opposite side, consisting of a side bracket resembling an angle bracket, is connected with the box channel by means of a laterally disposed front bracket and a rear bracket which form two remaining opposite sides of the frame structure. One end of a long slotted drive link is pivotally disposed on the side bracket. The other end of the drive link is inserted within a gap between the glider and the slider created by shoulder rivets holding them together and retained there by a slider pin which maintains a sliding and pivotal contact with the slot of the drive link at that end. The main drive motor, disposed on a motor mounting bracket, can be manually shifted to various positions on two guide rods laterally disposed on the frame. A control handle for manual shifting of the main drive motor is projected outwardly through a rectangular opening in the front wall of the housing and is rigidly secured to the motor mounting bracket.

The drive shaft of the main drive gearmotor points vertically upwards and is inserted through a mating slot in an eccenter having an eccentrically located pin which slides and rotates within the long slot of the drive link located above the eccenter. The radial distance between the eccentric pin and the drive link pivot is determined by the lateral position of the motor mounting bracket on the guide rods. The rolling pin stroke length is inversely related to this radial distance. Thus the operator can continuously vary the extent of the rolling pin stroke by manually shifting the control handle in a lateral direction. The same multifunction control handle is also used for raising, lowering and pressing the rolling pin over the dough. In any of its lateral positions, the control handle can be upwardly raised to create sufficient clearance between the rolling pin and the disc board for placing or removing the dough products. This upward motion of the control handle is possible due to a four-bar mechanism disposed to lift the entire frame structure along with the main drive gearmotor and the glider. The upper ends of the four-bar links are pivotally mounted on the sides of the frame structure, and the lower ends are pivotally mounted on two lower brackets rigidly secured to the side walls of the housing. The movement of the four-bar mechanism is stabilized and synchronized with two laterally disposed tie members, each rigidly connecting two links.

Once the control handle is fully upraised, it is retained in that position against a stop switch which is of a type having normally closed contacts. Retention of the handle in a full up position is effectuated by a plurality of resilient means such as tension springs connecting housing walls and the frame sub-assembly. These springs counterbalance all stationary and moving loads of the mechanism supported by two lower brackets and bring the control handle effort within a very comfortable range. When the control handle is fully upraised against the stop switch, it cuts off the power supply to both the main drive motor as well as the disc drive motor. This momentary stop switch permits the operator to load and unload the dough and also to intermittently manipulate the dough disc manually during the rolling operation. A separate ON/OFF switch is provided to turn off the power for extended periods. The speed of the rolling pin stroke is controlled with a standard speed control pack associated with the main drive motor. The speed control knob is conveniently located on the top of the housing.

Another feature of the invention enables the operator to halt the rolling pin at one of the extremities of its strokes, particularly the longest, by positioning the control handle for the desired stroke length and stalling the main drive motor by turning its speed down to a minimum when the rolling pin approaches the extremity of its travel, and lastly by cutting of the power supply by raising the control handle full up. This allows the operator complete access to the disc board for manipulating the dough.

Other objects, features and advantages including the suitability of this invention as a household appliance will be readily apparent to those skilled in the art, from the following detailed description, taken in conjunction with the annexed sheets of drawings, on which is shown a preferred embodiment of the invention.

DESCRIPTION OF PREFERRED EMBODIMENT

Figure 1:
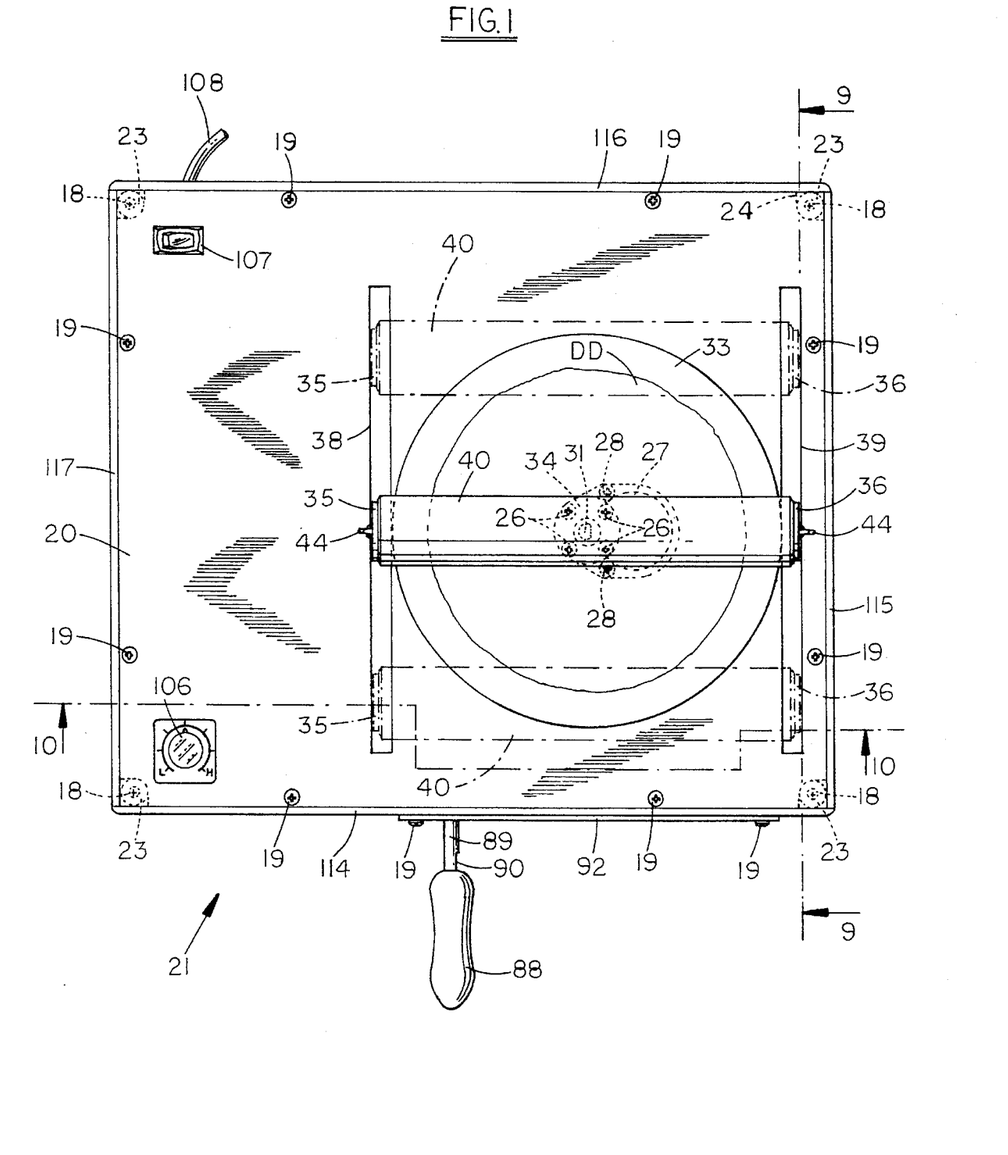
FIG. 1 is a plan view of the electric rolling pin apparatus with the elements of the invention shown in their pressing position.
Figure 2:
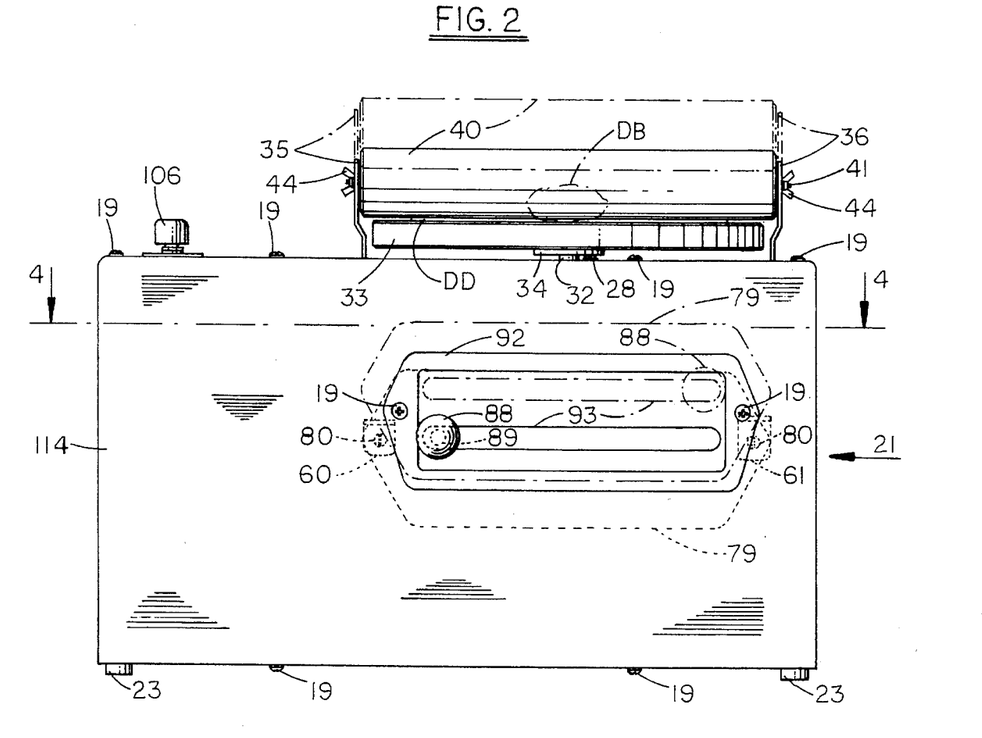
FIG. 2 is an elevation view of the apparatus of FIG. 1.
Figure 4:
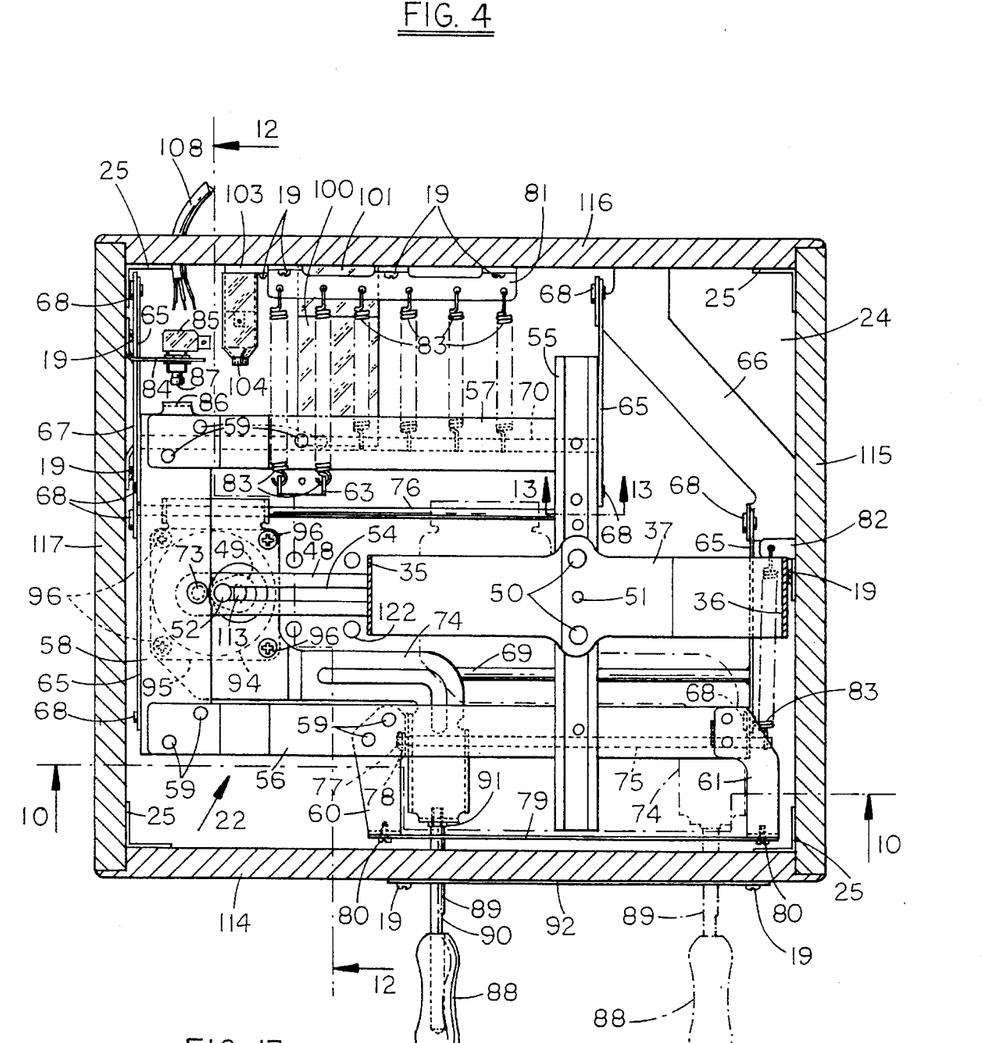
FIG. 4 is a sectional plan view taken along the line 4—4 of FIG. 2.

The electric rolling pin mechanism 22 of FIG. 4 embodying the present invention is housed inside a box-like structure 21 shown in FIGS. 1 and 2 supported by legs 23 rigidly secured to the bottom surfaces of the side panels 115 and 117 by screws 18. The principal elements of the box housing are the front and the rear panels 114 and 116, and the side panels 115 and 117, forming the side walls of the housing, covered at the top by a top cover plate 20 secured to the top surfaces of the panels by screws 19 and covered at the bottom by a bottom cover 24 having ventilation holes 122, and secured to the bottom surfaces of the panels by screws 19. Panels 114, 115, 116, and 117 are rigidly held together by angle brackets 25 and flat countersunk head screws 26.

Figure 14:
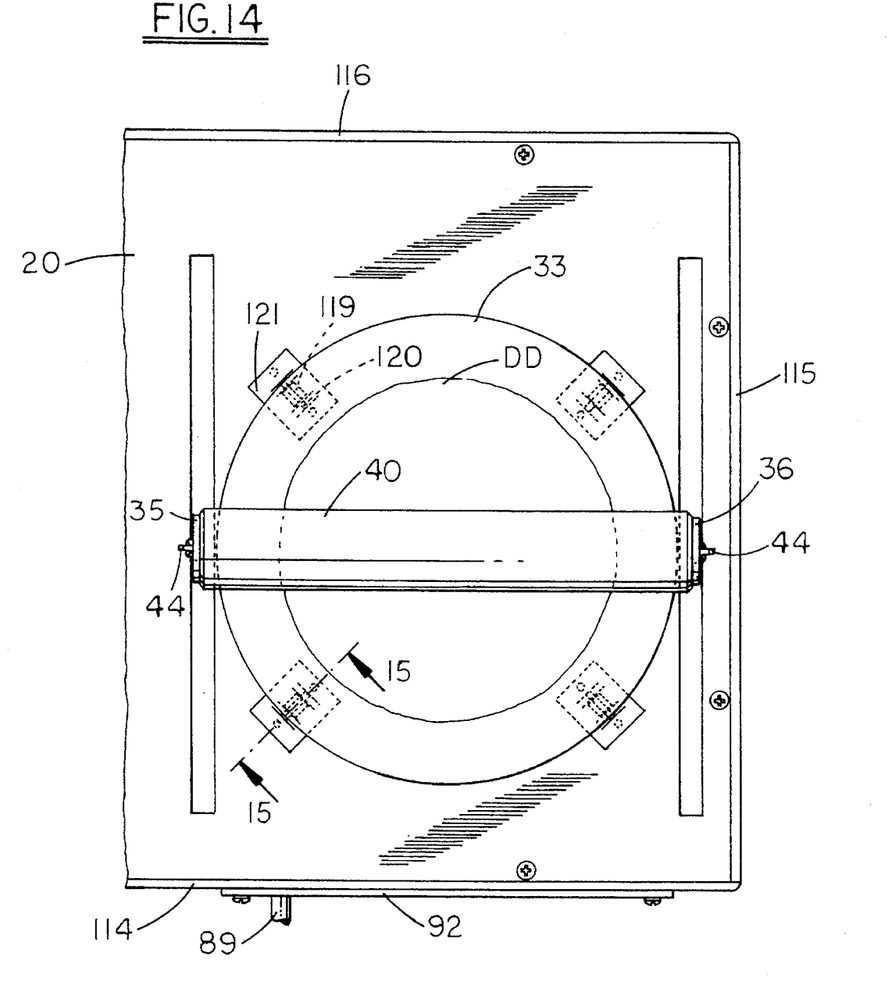
FIG. 14 is a fragmentary plan view similar to FIG. 1 showing an alternate embodiment illustrating a disc board supported by rollers.
Figure 15:
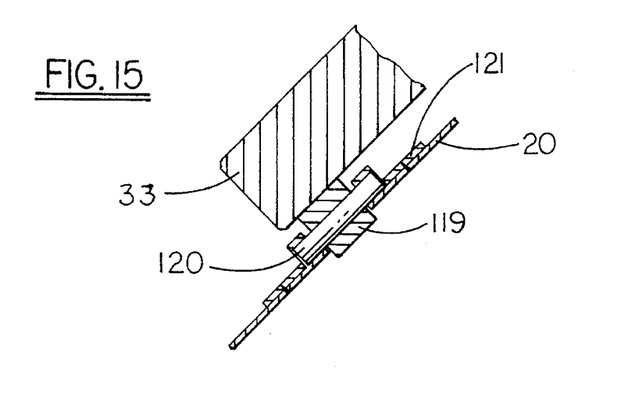
FIG. 15 is an enlarged fragmentary sectional view taken along the line 15—15 of FIG. 14.

A disc drive gearmotor 27 is mounted on the inner side of the top cover plate 20 with screws 28, lock washers 29 and nuts 210. The drive shaft 31 and the bearing collar 32 of the disc drive gearmotor 27 are protruded outwardly through a hole in the top cover plate 20, on which is mounted a disc board sub-assembly, comprising a disc board 33, and a flanged bushing 34 having a mating slot for the drive shaft 31, secured to the bottom surface of the disc board 33 by flat countersunk head screws 26. In an alternate embodiment illustrated in FIGS. 14 and 15, disc board 33, when too large is supported near its periphery by plurality of rollers 119 pivotally mounted on pins 120 which are rigidly secured between the top cover plate 20 and spot welded brackets 121.

Two arms 35 and 36 of a glider 37 shown in FIG. 4 are protruded upwardly through two long parallel slots 38 and 39 in the top cover plate 20, each laid diagonally across and tangentially to the disc board periphery. A conventional rolling pin 40 is mounted between two arms 35 and 36 of the glider 37. A rolling pin pivot bar 41, better shown in FIG. 10, passes through a bore 42 in the rolling pin and supports two disc bearings 43 glued to the end surfaces of the rolling pin 40. Two threaded ends of the pivot bar 41 are pivotally supported by the glider arms 35 and 36 at their upper ends and retained by wing nuts 44.

Figure 5:
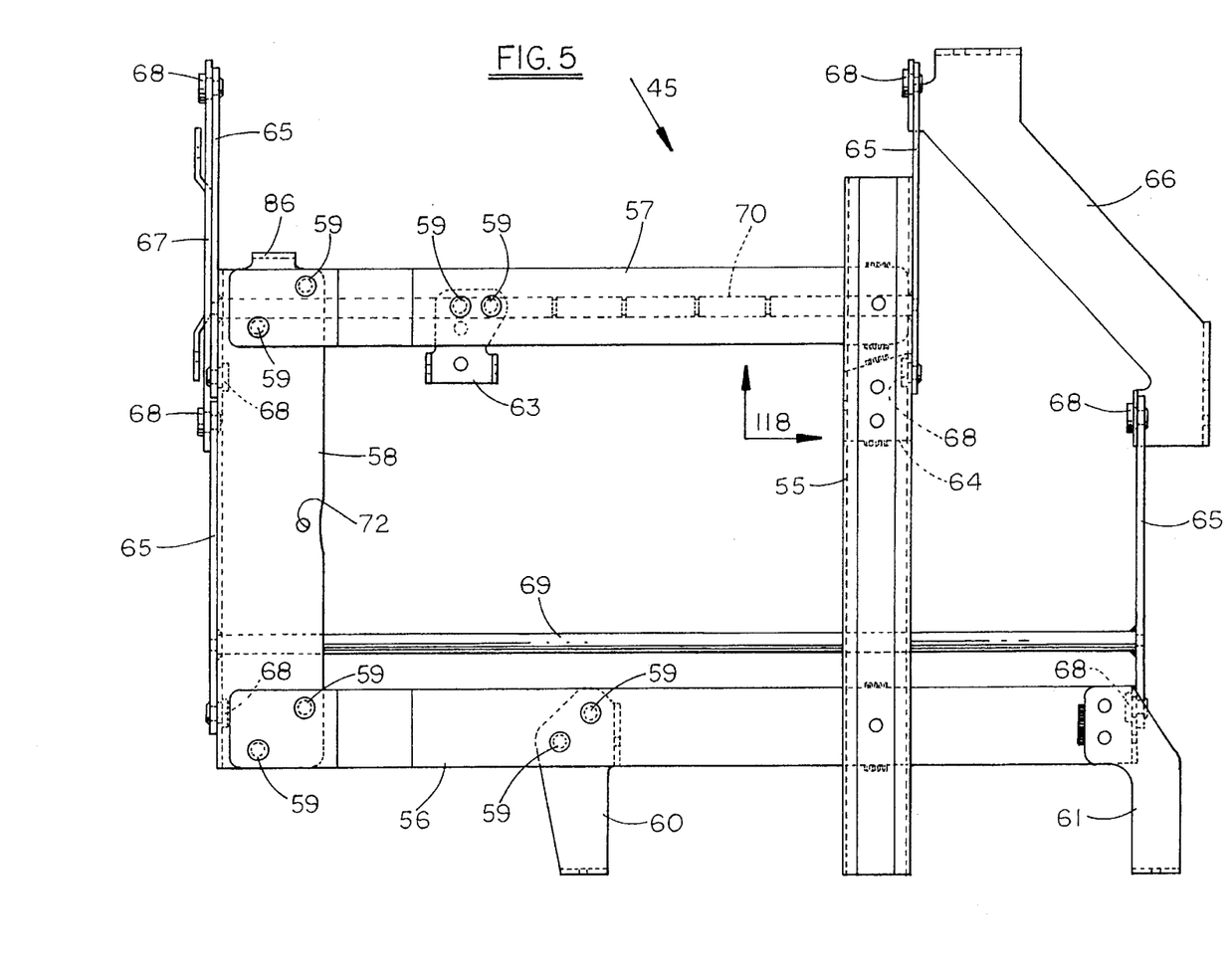
FIG. 5 is an enlarged supplemental plan view of the frame sub-assembly shown in FIG. 4.
Figures 6, 7, 8:
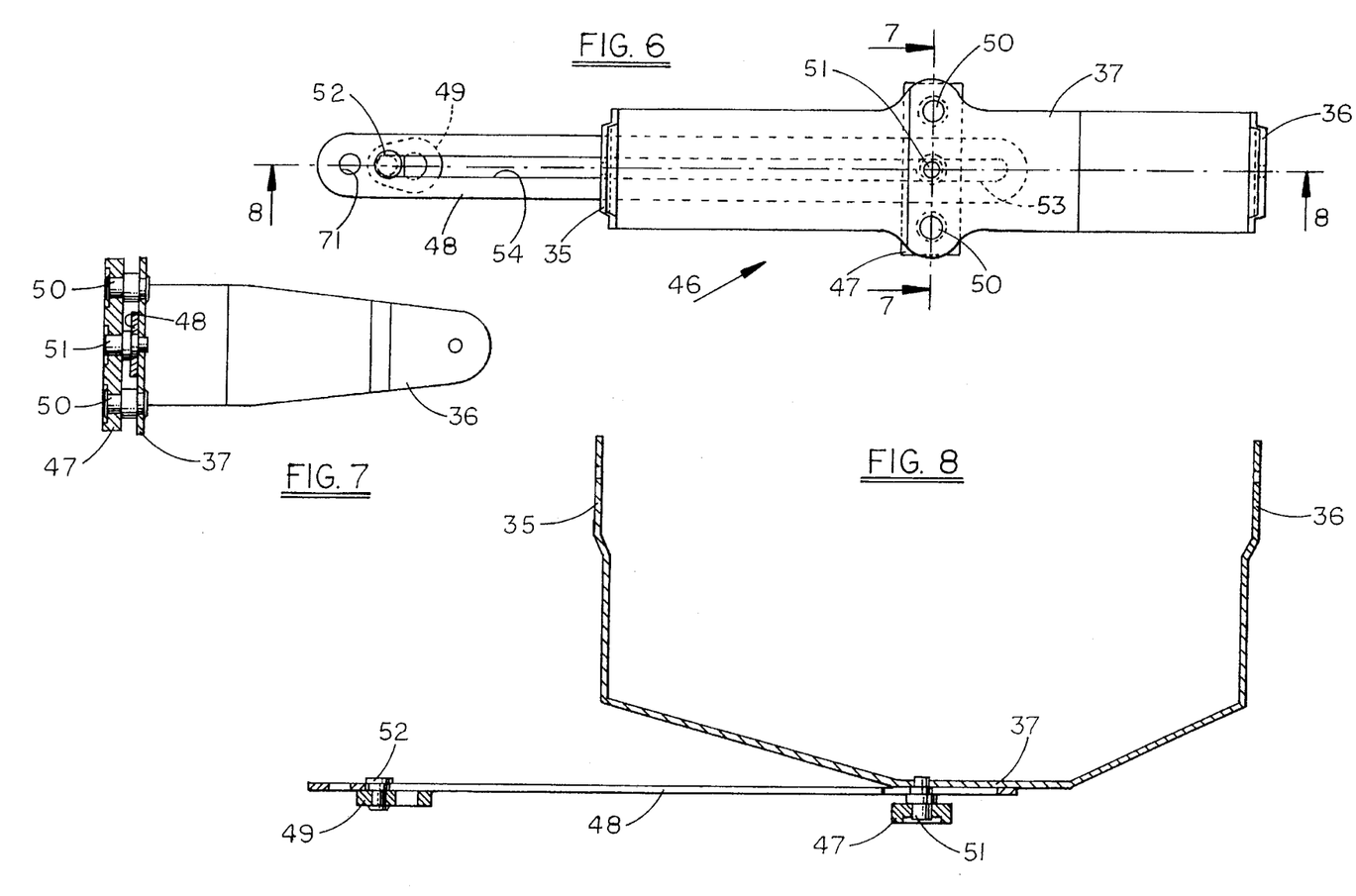
FIG. 6 is an enlarged supplemental plan view of the glider sub-assembly shown in FIG. 4.
FIG. 7 is a sectional view taken along the line 7—7 of FIG. 6.
FIG. 8 is a sectional view taken along the line 8—8 of FIG. 6.

The motion of the glider 37 and hence the rolling pin 40 is controlled by mechanism 22 of the present invention shown in FIG. 4, part of which comprises two sub-assemblies; namely, the frame sub-assembly 45 shown in FIG. 5 and the glider sub-assembly 46 shown in FIG. 6. With respect to the latter, the glider 37 having a U shape has a slider 47 disposed equidistant from its two arms 35 and 36, and rigidly secured to its bottom surface by two shoulder rivets 50, leaving a gap between the two equal to the shoulder height of the rivets. A slider pin 51 is centrally and pivotally disposed within the gap and retained in its position by the shoulder rivets 50. One end of a long slotted drive link 48 maintains sliding and pivotal contact between slot 53 and one of the shoulders of slider pin 51. An eccenter 49 is disposed under the drive link 48 and retained by a rivet pin 52, also described as an eccentric pin, which slides and rotates freely within the slot 54, which is a continuation of slot 53, disposed along the length of the drive link 48. Slots 53 and 54 may or may not be of the same size, depending on the sizes of the two pins 51 and 52.

Figure 11:
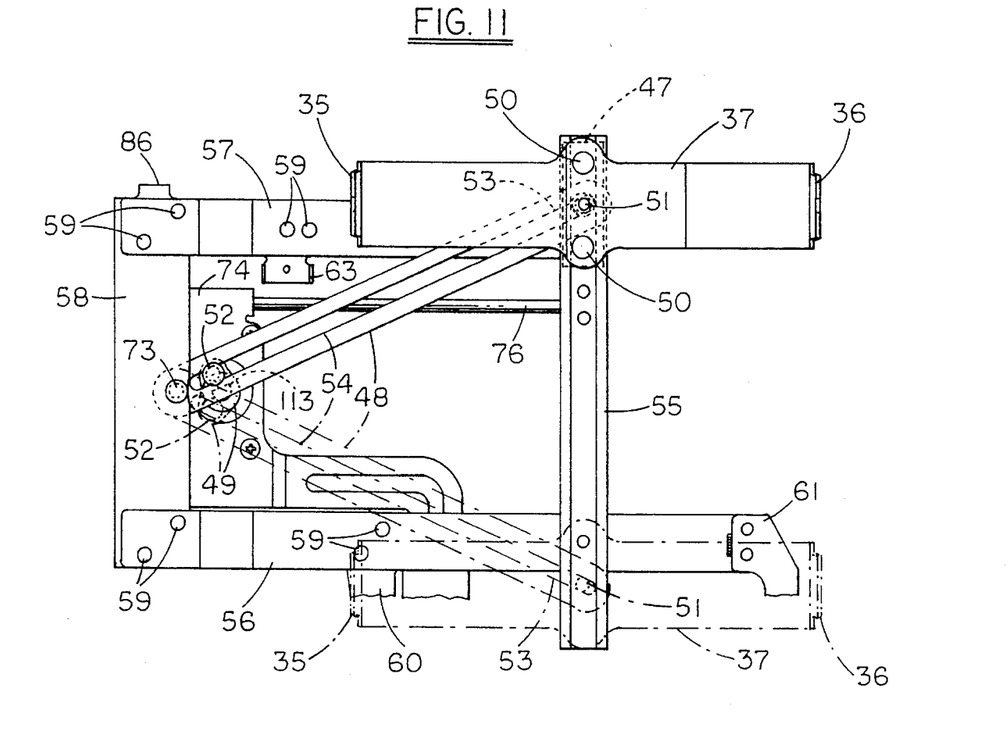
FIG. 11 is a fragmentary view of a portion of the apparatus mechanism of the present invention illustrated in FIG. 4 illustrating the range of operation of the glider sub-assembly.
Figure 12:
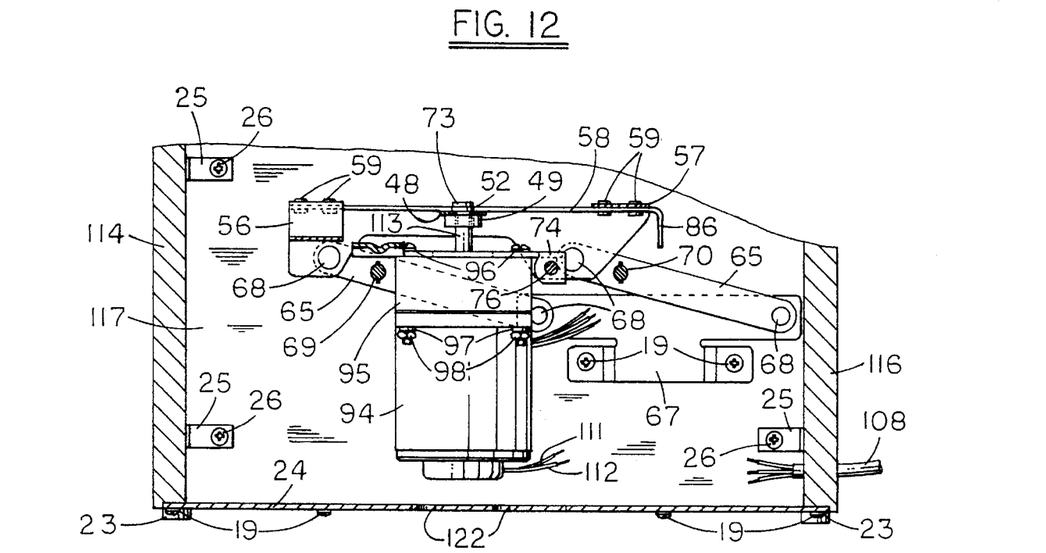
FIG. 12 is a fragmentary sectional view taken along the line 12—12 of FIG. 4.
Figure 13:
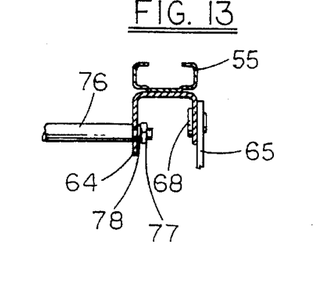
FIG. 13 is a sectional view of guide rod, channel bracket, box channel and bar link assembly taken along the line 13—13 of FIG. 4 with other elements omitted for clarity.

The frame sub-assembly 45 includes a rectangular frame-like structure 118 disposed in a horizontal plane having laterally disposed front and rear brackets 56 and 57, which form two opposite sides of the rectangular structure, and connect transversely disposed side bracket 58 and a roll formed box channel 55, which constitute the remaining opposite sides. The front and the rear brackets 56 and 57 are welded to the web of the box channel 55 which constitutes its bottom surface. A horizontal flange of the side bracket 58 which resembles an angle bracket, is rigidly secured to the front and the rear brackets 56 and 57 by rivets 59. A cover mounting bracket 60 is rigidly secured to the bottom surface of the front bracket 56 by rivets 59. Another cover mounting bracket 61 is rigidly welded to the top surface of the front bracket 56 in order to facilitate the moving parts under it. A spring mounting bracket 63 is rigidly secured to the rear bracket 57 by rivets 59. On the bottom web of the box channel 55 is welded a small channel bracket 64. With respect to FIGS. 4, 5 and 11, the holes shown on the box channel 55 and the cover mounting bracket 61 are meant only for locating the mating parts prior to welding.

Although the frame structure 118 is described here in terms of specific embodiments, it will be obvious to those skilled in the art, that this structure can be designed and built in several different ways commensurate with the tooling budget and the production volume.

The frame sub-assembly 45 further comprises a four-bar mechanism for raising and lowering the frame structure 118, and two lower brackets 66 and 67 for pivotally supporting the lower rear ends of the four-bar links 65 on pivot pins 68. The upper frontal ends of two of the four-bar links 65 are pivotally mounted to the downwardly projected vertical flange of the side bracket 58 by pivot pins 68. The upper frontal end of one of the four-bar links 65 is pivotally mounted to one of the downwardly projected vertical flange of the channel bracket 64 by a pivot pin 68. The upper frontal end of the last of the four-bar links 65 is pivotally mounted to the downwardly projected vertical tab of the front bracket 56 by a pivot pin 68. To ensure stabilization and synchronization of the four-bar mechanism, the front pair of the four-bar links 65 are rigidly connected by a laterally disposed front tie member 69, preferably a bar, and the rear pair of the four-bar links 65 are rigidly connected by a laterally disposed rear tie member 70, preferably a bar.

With reference to FIG. 4, the frame sub-assembly 45 and the glider sub-assembly 46 described above are mutually engaged by disposing slider 47 within the box channel 55 and pivotally mounting the far end of the drive link 48 having a pivot hole 71, under the horizontal flange of the side bracket 58 having a rivet hole 72 for rigid retention of the drive link pivot 73.

Figure 10:
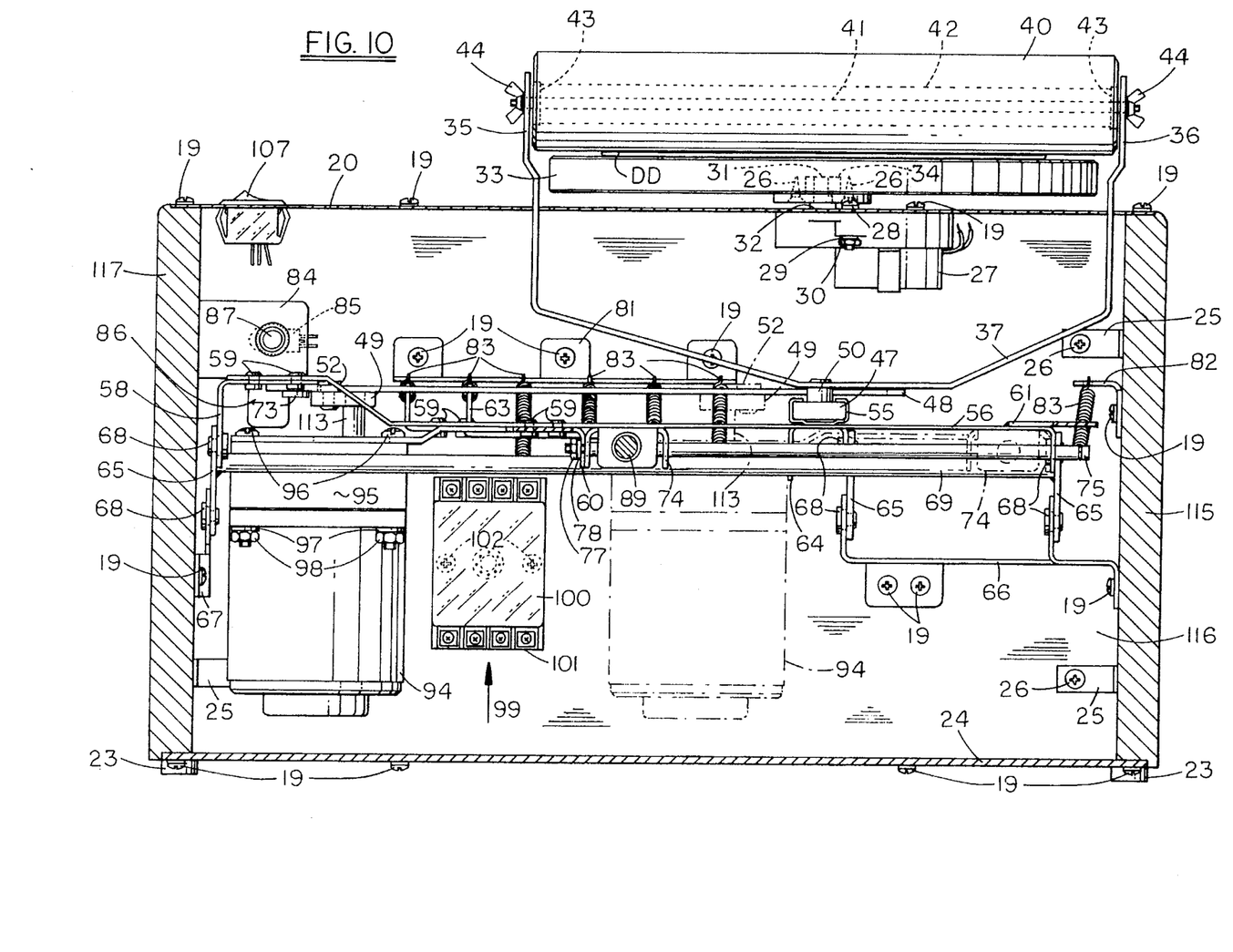
FIG. 10 is an enlarged sectional view taken along the line 10—10 of FIG. 1 and FIG. 4.

Under the drive link 48 and the front bracket 56 is disposed a motor mounting bracket 74, better shown in FIGS. 4 and 10. The motor mounting bracket 74 is retained on the frame structure 118 by two laterally disposed parallel guide rods 75 and 76. The threaded end of the front guide rod 75 is rigidly fastened to a downwardly projected vertical tab of the cover mounting bracket 60 by a nut 77 and a lock washer 78. The other end of the front guide rod 75 is loosely inserted through a hole in the downwardly projected vertical tab of the front bracket 56 for support. The threaded end of the rear guide rod 76 is rigidly fastened to one of the downwardly projected vertical flanges of the channel bracket 64 by a nut 77 and a lock washer 78. The other end of the rear guide rod 76 is loosely inserted through a hole in the downwardly projected vertical flange of the side bracket 58 for support. The motor mounting bracket 74 is formed into a channel-like structure in the vicinity of the two guide rods 75 and 76, which pass through two concentric holes in the downwardly projected vertical flanges of these channel-like structures and allow sliding movement of the motor mounting bracket 74 in a horizontal plane. The downwardly projected vertical tabs of the cover mounting bracket 60 and the front bracket 56 provide limiting stops for the travel of the motor mounting bracket 74. A front cover plate 79 is rigidly secured to the downwardly projected front tabs of the cover mounting brackets 60 and 61 by two self-tapping screws 80.

The part of the mechanism 22 described above is installed within the box housing 21 by rigidly securing the left lower bracket 67 to panel 117 and the right lower bracket 66 to panels 116 and 116 by screws 19. Two brackets 81 and 82 are rigidly secured to panels 116 and 115 respectively by screws 19. A plurality of resilient means such as tension springs 83 are anchored to the bracket 81 having several anchor holes juxtaposed on a flange. The other ends of some of these tension springs are attached to the tie bar 70 having several grooves, and remaining springs are attached to the bracket 63. One of the tension springs 83 is anchored to the bracket 82 with its other end attached to the extended portion of the guide rod 75 having a groove.

A switch mounting bracket 84 having slotted mounting holes is rigidly secured to panel 117 by screws 19. A standard push button stop switch 85 having normally closed contacts is installed through a slotted hole in bracket 84. The slotted holes are used to align the switch button 87 with a tab 86 located at the rear of the side bracket 58. When the frame structure 118 is fully upraised on the four-bar links 65, the tab 86 makes contact with the switch button 87 and presses it to cut off the power supply. The tab 86 remains pressed against the switch button 87 due to the pull of the plurality of tension springs 83. When the frame structure 118 is lowered against the pull of the tension springs 83, the tab 86 disengages the switch button 87 and power is restored to the apparatus.

The raising and lowering of the frame structure 118 is accomplished by means of a control handle 88 which is rigidly secured to a bar 89 having its threaded end assembled to a tapped hole provided on a tab formed at the front end of the motor mounting bracket 74. Flat 90 on the bar 89 is provided for assembling the bar 89 and a lock washer 91 to the motor mounting bracket 74. Bar 89 has a freedom of horizontal and vertical movements inside the rectangular opening on the front panel 114 and a face plate 92 rigidly secured to it by screws 19. Bar 89 also has a freedom of horizontal movement inside a slot 93 on the front cover plate 79, which moves up and down along with the bar 89.

Figure 9:
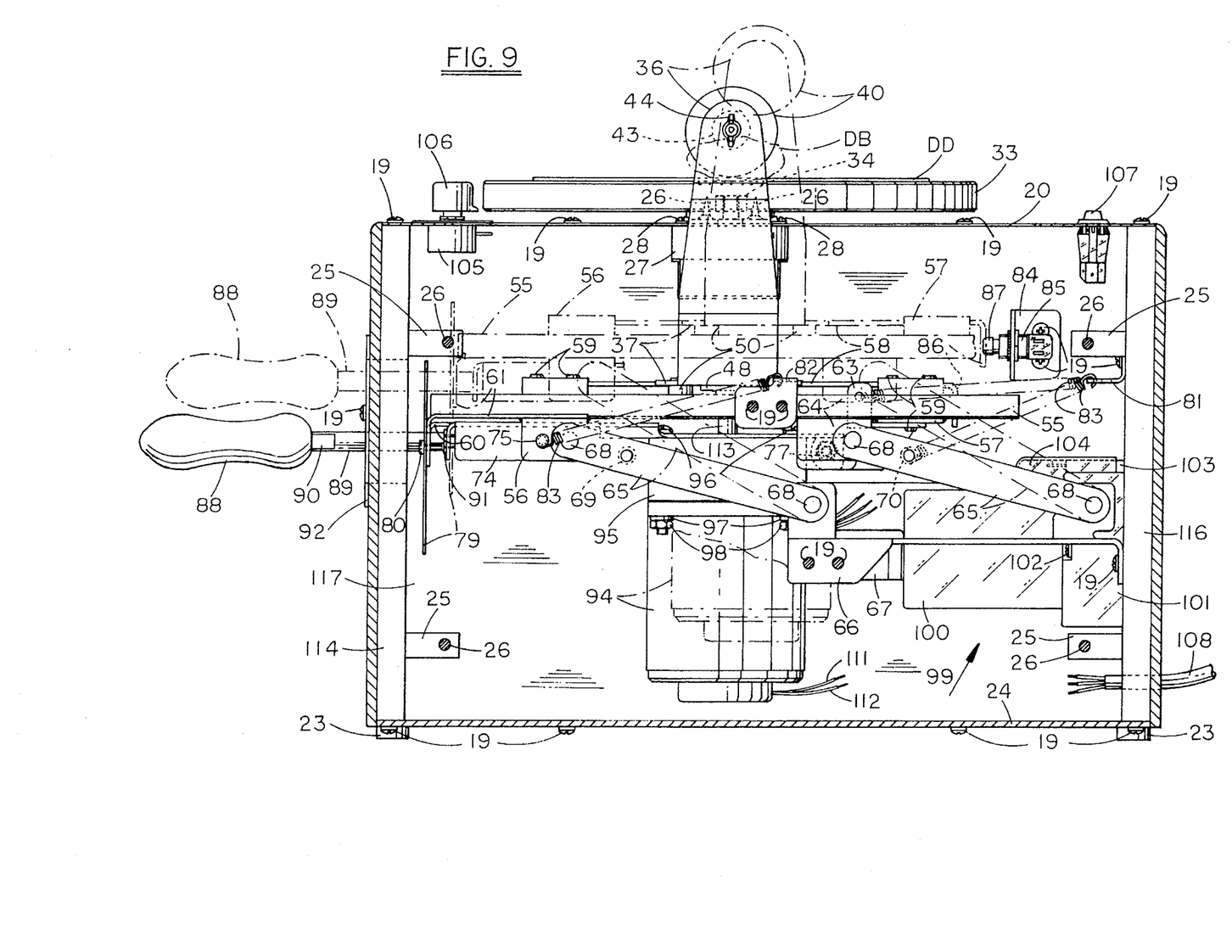
FIG. 9 is an enlarged sectional view taken along the line 9—9 of FIG. 1.

A variable speed motor 94 and a gearhead 95 are secured to the motor mounting bracket 74 by screws 96, lock washers 97 and nuts 98. The drive shaft 113 of the gearhead 95 protrudes vertically upwards through a mating slot in the eccenter 49. Depending on the tolerance conditions, the bottom surface of the eccenter 49 normally rests on a minute shoulder at the end of the flat on the drive shaft 113, the flat being no more in length than the minimum thickness of the eccenter 49. A standard speed control pack 99 consisting of an electronic speed control module 100 and a socket 101, is secured to the rear panel 116 by screws 102. A capacitor 103 having a plastic cap 104 is secured to the rear panel 116 by a screw 19. A standard speed potentiometer 105, better shown in FIG. 9 and having a rotary control knob 106, is mounted on the top cover plate 20 so as to be easily accessible to the operator. A standard ON/Off power switch 107 for turning the power off for extended periods is mounted on the top cover plate 20. A standard power cord 108 is inserted into the box housing 21 through a hole in the rear panel 116 and retained on the panel by means of a knot (not shown) on the cord placed between the panel hole and a cable clip (not shown). All electrical components are connected according to a schematic wiring diagram shown in FIG. 3. Ground wires are omitted from the diagram. Leads 109 and 110 are connected to the power cord 108. Leads 111 and 112 provide speed feed back signals to the speed control pack 99 which adjusts the motor speed in accordance with the speed setting on the speed potentiometer 105. The length and the contour of the main drive motor leads are so determined as to allow the motor 94 to slide freely over the guide rods 75 and 76.

The operation of the apparatus will now be described in detail. In its idle state, when the power switch 107 is in OFF position, or at the beginning of a new dough rolling cycle, it is advantageous to position the control handle 88 at the top right hand corner of the rectangular opening in the front panel 114 as shown by the extreme position of the control handle 88 in FIG. 2. In this fully upraised position of the control handle 88, the contacts of the stop switch 85 remains open, hence, until the control handle 88 is slightly pressed by the operator, the power is not supplied to the apparatus even when the power switch 107 is turned on. A dough ball DB is placed at the center of the disc board 33, while the rolling pin remains approximately within ±½ inches from the center of the disc, depending on the angular starting position of the eccenter 49. Usually the dough ball DB is thoroughly sprinkled with dry flour at the beginning of and intermittently during the rolling operation to prevent sticking. If the disc board 33 is replaced by a metallic disc plate, the use of anti-stick coating, such as tetrafluroethylene compound or the like, is an option. When the operator presses the control handle 88 against the pull of the plurality of tension springs 83, the glider 37 is imparted a downward motion through the motor mounting bracket 74, the guide rods 75 and 76, the frame structure 118 having the box channel 55, the slider 47 and the rivets 50. The glider arms 35 and 36 eventually transmit this downward motion to the rolling pin 40 which comes down on the dough ball along an arcuate trajectory dependent on the arcuate motion of the four-bar links 65 between their two extreme positions shown in FIG. 9. The upper pivoting ends of the four-bar links 65 impart their arcuate motion to the frame structure 118 while the lower pivoting ends are held at a fixed location on the lower brackets 66 and 67. With respect to FIG. 9, the elements are so proportioned as to have the verticle center lines of the rolling pin 40 and the disc board 33 coincide with each other when the former is in the middle of its stroke and fully pressed down. At the beginning of the downward motion of the control handle 88, tab 86 on the side bracket 58 disengages the switch button 87, thereby closing the contacts of the stop switch 85 and restoring power to the apparatus. Thus, the capacitor 103 gets energized and starts the main drive motor 94. The disc drive motor 27, preferably a miniature permanent magnet gearmotor, also starts rotating at a very low speed which is compatible with the speed-torque characteristics of the main drive motor 94. In their extreme right position, the control handle 88, the motor mounting bracket 74, and the main drive motor 94 are closest to the box channel 55 as shown in FIGS. 4 and 10. The rotary motion of the eccenter 49 is transmitted to the eccentric pin 52 which rotates inside the slot 54 of the drive link 48. Translation in the relative movement of the drive link 48 about its pivotal center 73 on the side bracket 58 and the rotary movement of the eccenter 49 about the drive shaft 113 incident to the ratio of the greater radius between the eccentric pin 52 and the drive link pivot 73 relative to the radius between the eccentric pin 52 and the drive shaft 113 provides smaller displacement of the drive link 48 for a given angular displacement of the driveshaft 113. Furthermore, for a given angular displacement of the drive shaft 113, the angular displacement of the drive link 48 is smallest when the radial distance between the eccentric pin 52 and the drive link pivot 73 is largest. Thus, for a given angular displacement of the drive shaft 113, the angular displacement of the drive link 48 increases in proportion to the decrease in the radial distance between the eccentric pin 52 and the drive link pivot 73, due to bringing the motor mounting bracket 74 in closer proximity to the drive link pivot 73. The arcuate motion of the drive link 48 is translated into the reciprocatory motion of the slider 47 through the sliding and rotational contact between the slot 53 and the slider pin 51. Thus, the slider 47, the glider 37 and the rolling pin 40 reciprocate, guided by the box channel 55. The extent of their stroke is determined by the lateral position of the control handle 88 within the slot 93 on the front cover plate 79.

With the control handle 88 at the right extremity of its travel, the rolling operation begins with the smallest strokes of the rolling pin 40. Simultaneously, the dough ball DB on the disc board 33 starts rotating at a very low speed. Thus, with every stroke of the rolling pin 40, the dough ball DB expands along the direction of the stroke. Since the angular orientation of the dough ball DB is in continuous change relative to the direction of the rolling pin stroke, the dough ball gradually develops into a larger and thinner disc of dough. As the dough ball or the disc becomes larger in diameter, the operator increases the length of the rolling pin stroke by shifting the control handle 88 to the left, which reduces the radial distance between the eccentric pin 52 and the drive link pivot 73. Thus the dough disc DD keeps growing into larger and larger disc. As the length of the rolling pin stroke increases, unless the speed of the main drive motor 94 is changed, its velocity will also increase. This is due to the fact that, for a constant motor speed, the time duration of the stroke, regardless of its length remains the same. For smooth operation of the apparatus, it is desirable that the differences between the velocities of the rolling pin 40 corresponding to the various lengths of its strokes be minimum.

Figure 3:
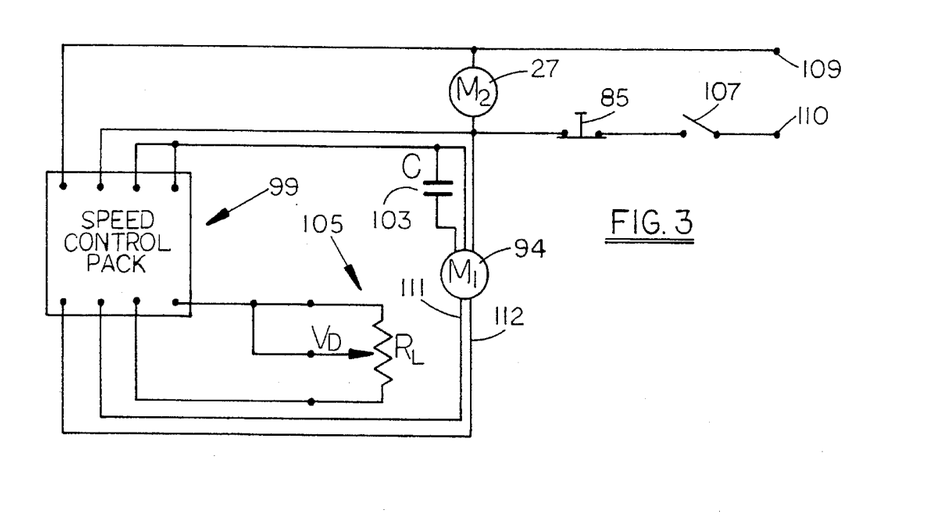
FIG. 3 is a schematic electrical diagram illustrating the apparatus function of the present invention.

In the preferred embodiment of this invention, the speed of the main drive motor 94 is changed by means of a standard speed control pack 99 having a plurality of terminals on its socket 101 connected to other electrical components as shown in the schematic wiring diagram given in FIG. 3. The motor speed is adjusted by rotating the knob 106 of the speed potentiometer 105 located on the top cover plate 20.

At any point during the rolling operation, the operator can stop the apparatus simply by lifting the control handle 88 fully up and engaging the tab 86 with the switch button 87 which cuts off the power supply. This can be done at any of the lateral positions of the control handle 88 within the slot 93. These intermittent stops allow the operator to run over the dough disc DD or sprinkle flour on both the surfaces of the dough disc or reposition and reorient the dough disc on the disc board 33 for creating a perfect round etc. During the rolling operation, the operator can also skip few strokes when necessary, by partially lifting the control handle 88 so as not to cut off the power. This keeps the disc board 33 rotating while the rolling pin 40 continues to reciprocate but ceases to press and roll the dough disc DD.

The rolling pin 40 can be brought to a halt at one of the extremities of its longest stroke by simply shifting the control handle 88 to its left extremity of travel and turning the speed potentiometer knob 106 down to its lowest speed mark when the rolling pin 40 approaches one of the extremities of its stroke. This keeps the thermally protected main drive motor 94 energized, but the apparatus friction is sufficient to stall the motor. The disc drive motor 27 keeps rotating until the control handle 88 is fully lifted up for cutting off the power supply to both the motors. In this setting, the operator can again lower the control handle 88 to reorient the disc board 33 and the dough disc DD as desired.

The plurality of tension springs 83 are so designed and positioned as to counterbalance the moment due to all the stationary and moving loads in all the situations, acting at the four-bar link pivots 68 on the lower brackets 66 and 67. Furthermore, the pull due to these tension springs 83 is just about sufficient to overcome the spring action of the switch button 87 on the tab 86. Under all circumstances pertaining to the apparatus operation, the effort required to overcome tension springs 83 and lower the control handle 88 is reasonably comfortable. The rolling pin 40 can be easily removed for cleaning purposes by unscrewing one of the wing nuts 44. The disc board 33 can be removed for cleaning purposes by simply lifting it up from the drive shaft 31.

Although the invention electric rolling pin apparatus disclosed herein is described in terms of preferred embodiment, it is to be understood that the detailed description set forth therein is by way of illustration only and not of limitation, and that a wide variety of alternate embodiments and modifications can be contemplated without departing from the spirit and scope of this invention. All such alternate embodiments are intended to be included within the scope of the appended claims.

What I claim and desire to secure by Letters Patent is:

1. An electric rolling pin apparatus for making discs of dough comprising:

an enclosed mechanism housing structure having four side walls, a top cover plate, and a bottom cover;

a motor-driven rotating disc means located on top of said housing structure;

a reciprocating rolling pin on top of said disc means pivotally supported by two arms of a glider protruded upwardly through two parallel slots in said top cover plate, each laid diagonally across and tangentially to the periphery of said disc means;

said glider formed into a U shape, having a slider disposed equidistant from its two vertical arms and rigidly secured to its bottom surface by shoulder rivets, leaving a gap between the two, equal to the height of said shoulders;

a long slotted drive link disposed within said gap between said glider and said slider with its slot at one end in sliding and rotational contact around one of the shoulders of a centrally located slider pin pivotally disposed between said glider and said slider and held in its position by said shoulder rivets disposed on both sides of its central location;

an eccenter having a mating slot to receive a drive shaft of a main drive gearmotor and an eccentric pin rigidly secured at an eccentric distance from the axis of said mating slot;

said eccentric pin having its middle shoulder in sliding and rotational contact with the remainder of the long slot in said drive link which is retained in sliding contact between the head of said eccentric pin at the top and said eccenter at the bottom;

a rectangular frame-like structure disposed in a horizontal plane within said housing structure having laterally disposed front and rear brackets to form two opposite sides of said rectangular frame structure, connecting a transversely disposed side bracket and a slider guiding means which form remaining two opposite sides;

said drive link having its other end pivotally mounted on the horizontal flange of said side bracket and said slider installed within said slider guiding means on the opposite side; and a motor mounting bracket disposed on said frame structure, for rigidly securing said main drive gearmotor under said eccenter with its drive shaft protruding vertically upwards through the mating slot in said eccenter, thereby providing driving means to rotate said eccenter and said eccentric pin, causing arcuate displacement of said drive link about its pivot, resulting in the reciprocatory motion of said slider within said slider guiding means and also of said glider and said rolling pin mounted on it.

2. The apparatus as set forth in claim 1 further comprising a variable speed control unit for said main drive motor for adjusting the speed of the rolling pin stroke.

3. The apparatus as set forth in claim 1 wherein said disc means comprises a disc board, centrally mounted on a vertically protruded drive shaft of said disc drive gearmotor and can be dismounted for cleaning purposes by lifting it up.

4. The apparatus as set forth in claim 3 wherein said disc board can be supported near its periphery by a plurality of rollers pivotally mounted on said top cover plate.

5. The apparatus as set forth in claim 1 wherein said rolling pin is pivotally mounted on a central pivot bar pivotally supported by two arms of said glider, and retained on them by wing nuts disposed on its threaded ends which can be removed for dismounting said rolling pin for cleaning purposes.

6. The apparatus as set forth in claim 1 wherein said slider guiding means comprises a box channel and said slider having a compatible cross section.

7. The apparatus as set forth in claims 1 further comprising: means for mounting and guiding the lateral movement of said motor mounting bracket on said frame structure for altering the radial distance between said eccentric pin and said drive link pivot to cause the extent of the stroke of said rolling pin to increase or decrease;

stop means for limiting the extremities of movement of said eccentric pin relative to said drive link pivot; and a control handle means, rigidly secured to said motor mounting bracket and protruded outwardly through an opening in the front wall of said housing structure, to facilitate the lateral movement of said motor mounting bracket on said guide means.

8. The apparatus as set forth in claim 7 wherein said means for mounting and guiding the lateral movement of said motor mounting bracket comprises two laterally disposed parallel guide rods, each passing through a pair of concentrically juxtaposed holes on the flanges of two channel-like configurations on said motor mounting bracket, each located on the opposite side relative to the other with respect to the motor mounting location.

9. The apparatus as set forth in claim 8 wherein said rear guide rod is disposed between said side bracket and said channel bracket, and said front guide rod is disposed under said front bracket and between the bent tabs of said front bracket and said cover mounting bracket.

10. The apparatus as set forth in claim 7 wherein said stop means are located to limit the lateral movement of said motor mounting bracket relative to said frame structure.

11. The apparatus as set forth in claim 10 wherein said stop means are located to limit the lateral movement of said motor mounting bracket at the extremities of said front guide rod.

12. The apparatus as set forth claim 7 further comprising:

a right lower bracket member rigidly connectable to the walls of said housing structure;

a left lower bracket member rigidly connectable to the walls of said housing structure;

a first and a second pivot means connecting said fight lower bracket member and lower rear ends of a right rear and a right front link members of a four-bar mechanism disposed for raising, lowering and pressing said rolling pin over the dough;

a third and fourth pivot means connecting said left lower bracket member and lower rear ends of a left front and a left rear link members of said four-bar mechanism;

a fifth, sixth, seventh and eighth pivot means connecting said frame structure and the upper frontal ends of said links of said four-bar mechanism;

a laterally disposed rear tie member rigidly connecting said right rear and left rear links for stabilizing and synchronizing their function;

a laterally disposed front tie member rigidly connecting said fight front and said left front links for stabilizing and synchronizing their function;

a plurality of resilient means to counterbalance the moment due to all the stationary and moving loads acting on said four-bar mechanism and to maintain said frame structure in an upraised position against an upper stop means;

a lower stop means to limit the extension of said plurality of resilient means, when said rolling pin is dismounted for cleaning purposes; and said front wall of said housing structure having a rectangular opening to facilitate the vertical movement of said control handle for raising, lowering and pressing said rolling pin over the dough.

13. The apparatus as set forth in claim 12 wherein said pivot means connecting said frame structure and the upper frontal ends of said left front and said left rear link members of said four-bar mechanism are located on the downwardly projected vertical flange of said side bracket.

14. The apparatus as set forth in claim 12 wherein said pivot means connecting said frame structure and the upper frontal end of said right front link member of said four-bar mechanism is located on the downwardly projected vertical tab of said front bracket.

15. The apparatus as set forth in claim 12 wherein said pivot means connecting said frame structure and the upper frontal end of said right rear link member of said four-bar mechanism is located on one of the flanges of a channel bracket rigidly secured to the bottom of said box channel.

16. The apparatus as set forth in claim 12 wherein said resilient means comprising a plurality of tension springs are anchored to rigidly secured brackets on the walls of said housing structure, some connecting said rear tie member and some directly or indirectly connecting said frame structure.

17. The apparatus as set forth in claim 12 wherein said upper stop means comprising a stop switch having normally closed contacts, mounted on a bracket rigidly secured to a wall of said housing structure, adjacent to said frame structure having a tab on its rear for engaging the switch button when said frame structure is raised up by lifting said control handle biased by said resilient means.

18. The apparatus as set forth in claim 17 wherein said stop switch cuts off the power supply, upon being pressed by said tab on said frame structure, and restores power when said tab disengages said stop switch upon lowering of said control handle by the operator.

19. The apparatus as set forth in claim 18 wherein said rolling pin can be halted at the extremities of its strokes, particularly the longest, when said thermally protected main drive motor is stalled by reducing its speed and then de-energized by cutting off the power, thus enabling the operator to have complete access to said disc means for manipulating the dough.

20. The apparatus as set forth in claim 19 wherein the dough disc on said disc means can be reoriented by alternately lowering and raising said control handle while said main drive motor remains stalled.

21. The apparatus as set forth in claim 12 wherein said lower stop means is provided by the bottom edge of the rectangular opening in the front wall of said housing structure, which limits the downward motion of said control handle when said rolling pin is dismounted for cleaning purposes.

22. The apparatus as set forth in claim 12 further comprising a front cover plate rigidly secured to the mounting means extended from said front bracket, and having a laterally disposed slot to facilitate lateral movement of said control handle, said front cover plate substantially enclosing the moving components behind the rectangular opening in the front wall of said housing structure.

* * * * *

UNITED STATES PATENT AND TRADEMARK OFFICE
CERTIFICATE OF CORRECTION

PATENT NO. : 5,546,850
DATED : August 20, 1996
INVENTOR(S) : Vikram H. Zaveri

It is certified that error appears in the above-identified patent and that said Letters Patent is hereby corrected as shown below:

Col. 4, Line 14
"210" should read --30--

Col. 6, Line 4
"116 and 116" should read --115 and 116--

Col. 8, Line 48
"run" should read --turn--

Col. 10, Line 32
"claims" should read --claim--

Col. 11, Line 3
"fight" should read --right--

UNITED STATES PATENT AND TRADEMARK OFFICE
CERTIFICATE OF CORRECTION

PATENT NO. : 5,546,850
DATED : August 20, 1996
INVENTOR(S) : Vikram H. Zaveri

It is certified that error appears in the above-indentified patent and that said Letters Patent is hereby corrected as shown below:

Col. 11, Line 18
"fight" should read --right--

Signed and Sealed this

Nineteenth Day of November, 1996

Attest:

BRUCE LEHMAN

*Attesting Officer*     *Commissioner of Patents and Trademarks*